United States Patent [19]
Gaalswyk

[11] Patent Number: 5,174,244
[45] Date of Patent: Dec. 29, 1992

[54] LIVESTOCK FEED BATCHING SYSTEM

[76] Inventor: Mark K. Gaalswyk, R.R. One - Box 85, Welcome, Minn. 56181

[21] Appl. No.: 851,304

[22] Filed: Mar. 12, 1992

[51] Int. Cl.$^5$ .................. A01K 24/00; A01K 5/02
[52] U.S. Cl. .................. 119/51.01; 119/174
[58] Field of Search .................. 119/51.01, 72, 900, 119/174

[56] References Cited

U.S. PATENT DOCUMENTS

| | | | |
|---|---|---|---|
| 4,498,424 | 2/1985 | Leuschner | 119/51.01 |
| 4,624,215 | 11/1986 | Goldstein | 119/51.01 |
| 4,907,538 | 3/1990 | Helmle et al. | 119/51.01 |
| 5,008,821 | 4/1991 | Pratt et al. | 119/51.01 |

FOREIGN PATENT DOCUMENTS

| | | | |
|---|---|---|---|
| 873990 | 10/1981 | U.S.S.R. | 119/51.01 |
| 897185 | 1/1982 | U.S.S.R. | 119/51.01 |
| 9000384 | 1/1990 | World Int. Prop. O. | 119/51.01 |
| 9110358 | 7/1991 | World Int. Prop. O. | 119/51.01 |

*Primary Examiner*—John G. Weiss
*Attorney, Agent, or Firm*—Henderson & Sturm

[57] ABSTRACT

A method of automatically suggesting to the producer what ration a group of livestock should be fed currently, based on the amount of each ration originally requested. As a producer prepares to mix feed for a particular group of animals, the controller will automatically suggest, based on the amount of feed consumed what particular ration should currently be mixed. This feature is built into the software of the IBM compatible batch controller. The resulting benefit to the producer is a savings of approximately 2 to 3 dollars per head of livestock—each individual farmer typically feeds 4 to 20 thousand head per year.

1 Claim, 1 Drawing Sheet

---

Group Maintenance

Group # 44
Location # 1
Number of Head: 265
Group Description: FULL SLAT LIVESTOCK
Adjustment Rating: 1.0
Begin Weight: 5000.00    Begin Date: 10/04/91
End Weight: 0.00    End Date:

| Recipe Name | Req. Lbs./Head | Total Lbs. Required | Actual Lbs./Head | Actual Pounds | Start Day | End Day |
|---|---|---|---|---|---|---|
| 1) GTA STARTER | 35.00 | 9275.00 | 35.00 | 9275.00 | 1 | 21 |
| 2) MEC DEVELOPER<70 | 40.00 | 10600.00 | 40.00 | 10600.00 | 22 | 40 |
| 3) GTA DEV 75><100 | 70.00 | 18550.00 | 45.28 | 12000.00 | 41 | 52 |
| 4) GTA GROWER 100-160 | 210.00 | 55650.00 | 0.00 | 0.00 | 53 | 90 |
| 5) GTA FINISHER 160-SLL | 320.00 | 84800.00 | 0.00 | 0.00 | 91 | 139 |
| PreMix Weight | 0.00 | 178875.00 | | 31875.00 | | |

| Recipe Name | Req. Lbs./ Head | Total Lbs. Required | Actual Lbs./ Head | Actual Pounds | Start Day | End Day |
|---|---|---|---|---|---|---|
| 1) GTA STARTER | 35.00 | 9275.00 | 35.00 | 9275.00 | 1 | 21 |
| 2) MEC DEVELOPER<70 | 40.00 | 10600.00 | 40.00 | 10600.00 | 22 | 40 |
| 3) GTA DEV 75><100 | 70.00 | 18550.00 | 45.28 | 12000.00 | 41 | 52 |
| 4) GTA GROWER 100-160 | 210.00 | 55650.00 | 0.00 | 0.00 | 53 | 90 |
| 5) GTA FINISHER 160-SLL | 320.00 | 84800.00 | 0.00 | 0.00 | 91 | 139 |
| PreMix Weight 0.00 | | 178875.00 | | 31875.00 | | |

Group Maintenance

Group# 44
Location# 1
Number of Head: 265
Group Description: FULL SLAT LIVESTOCK
Adjustment Rating: 1.0
Begin Weight: 5000.00    Begin Date: 10/04/91
End Weight: 0.00    End Date:

LIVESTOCK FEED BATCHING SYSTEM

A portion of the disclosure of this patent document contains material which is subject to copyright protection. The copyright owner has no objection to the facsimile reproduction by anyone of the patent document or the patent disclosure, as it appears in the Patent and Trademark Office, patent file or records, but otherwise reserves all copyrights whatsoever.

TECHNICAL FIELD

This invention relates to livestock management, and more particularly to a method of automatically providing a series of livestock feed rations with the aid of a digital computer.

BACKGROUND ART

Typically, on livestock farms there are a series of rations that are fed as the animal progresses toward maturity—just as a human would consume baby food as an infant, and progresses to steak and potatoes as an adult. Transition between recipes is based on the amount of feed consumed per head of each particular ration level.

It is desirable to include multiple ration steps—each being tailored to the exact nutrient needs of the animal at each stage of growth. In practice, however, ration changes are made in a haphazard fashion and are of little benefit.

Those concerned with these and other problems recognize the need for an improved method of providing a series of livestock feed rations.

DISCLOSURE OF THE INVENTION

The present invention provides a method of automatically suggesting to the producer what ration a group of livestock should be fed currently, based on the amount of each ration originally requested. As a producer prepares to mix feed for a particular group of animals, the controller will automatically suggest, based on the amount of feed consumed, what particular ration should currently be mixed. This feature is built into the software of the IBM compatible batch controller. The resulting benefit to the producer is a savings of approximately 2 to 3 dollars per head of livestock—each individual farmer typically feeds 4 to 20 thousand head per year.

An object of the present invention is the provision of an improved method of providing a series of livestock feed rations.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figures 1, 2:
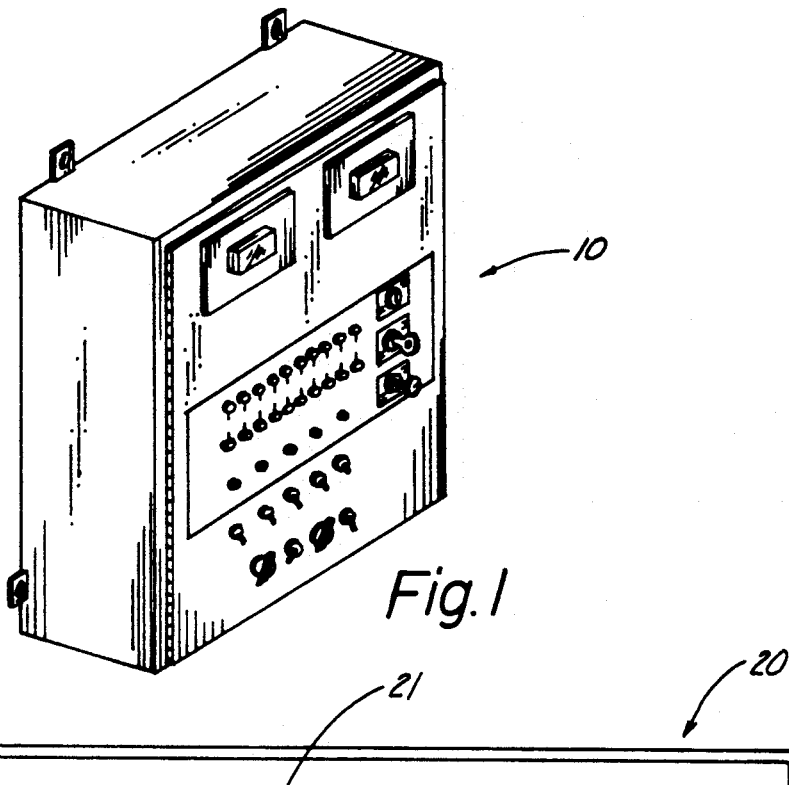
FIG. 1 is a perspective view of the control panel for the feed batching system.
FIG. 2 is an example screen print associated with the method of the present invention.

Referring now to the drawings, wherein like reference numerals designate identical or corresponding parts throughout the several views, FIG. 1 shows the control panel (10) for the automatic batching system of the present invention. The batch controller of the present invention has an IBM compatible computer designed into the batch controller. All feeding history is saved on an internally sealed dust-proof diskette for later removal and update into the farmer's accounting package. The user can run any other ration analysis or livestock accounting package directly from a feed mill screen, either an external or internal mounted VGA color monitor. The feed is mixed and all data is generated automatically. The feeding plan for each group of livestock is correlated based on consumption. The unit reminds a producer to reorder feed ingredients whenever the inventory on hand drops below the reorder point for that ingredient. For commercial users, an option is available to allow for networking of a number of feed mills together with the office accounting computer. All feed mixing data will then automatically update accounting data in the office to provide for quick invoicing, inventory tracking, and customer record keeping assistance.

The method of the present invention is practiced using an IBM compatible computer designed using a batch controller and copyrighted software entitled "EZ Weigh Feed Batching System", Copyright Registration No. TX 3 235 721, having an effective date of registration of Jan. 13, 1992, and owned by Easy Systems, Inc. of Trimont, Minn. 56176. The entire work, "EZ Weight Feed Batching System", is incorporated by reference herein.

FIG. 2 shows an illustrative screen print (20) to allow better understanding of the group feeding method described. The computerized feed mill which automatically suggests revised rations based on the quantity of each ration consumed is revolutionary to the feed industry. This allows the producers to provide for more rations steps—each better tailored to the exact nutrient needs of the animal at each stage of growth. Unless this ration changing is done automatically—the changes become so haphazard that having the different rations steps available is really pointless—since they end up being fed at the wrong times anyway. There is a large dollar savings advantage to each producer who is able to do the process automatically. The screen print (20) illustrates a sample feeding plan for a group of livestock with the group information shown in panel (21). The lower portion of the screen print (20) shows a number of columns, each having a descriptive heading. Column (22) lists a sequential series of five ration steps. The software referred to above enables the system to handle up to one hundred ration steps. Column (24) shows the pounds of each ration required for each head or unit of livestock, while column (26) shows the total pounds of each ration and the total pounds of all rations for the group. Column (28) lists the actual pounds of each ration per head that has been provided to date, while column (30) shows the total pounds of each ration prepared so far. The software enables the system to compare the total actual pounds to the pounds required to make the sequential ration selections. Columns (32) and (34) show the predicted day of ration changes for graphing capabilities.

The ability to automatically suggest rations to be fed to groups of livestock is based on the total weight of each ration previously consumed. The method of the present invention includes the following steps:

Step 1: The farmer or user enters into the system the prescribed weight of each feed formulation to be fed to a group of livestock. This feeding plan is stored within the automatic feed batching system.

Step 2: Each group of livestock is given a unique identifying code.

Step 3: When the user desires to mix feed for a particular set of animals, he enters the unique group code into the system.

Step 4: The feed preparation system will then look at how much weight of each particular ration was previously consumed and then suggest to the user the ration that should be prepared at this particular time. The system will do so by automatically analyzing the weight of each formulation prescribed versus how much weight has been previously blended.

Step 5: To mix the feed, the user may simply accept the suggested ration and the system will then automatically prepare the correct formulation required for this unique set of animals.

Step 6: The end result is that the user can automatically feed each group of livestock the exact weight of each ration step desired. This then locks in not only cost but a uniform meat.

Thus, it can be seen that at least all of the stated objections have been achieved.

Obviously many modifications and variations of the present invention are possible in light of the above teachings. It is therefore to be understood that, within the scope of the appended claims, the invention may be practiced otherwise than as specifically described.

I claim:

1. A method of automatically providing a series of livestock feed rations, with the aid of a digital computer comprising the steps of:
   (a) providing said computer with a predetermined livestock feeding plan, said livestock feeding plan including:
      a predetermined sequential series of feed rations and the total weight of each of the rations to be fed to a group of livestock;
   (b) providing the computer with a unique identifying code for the group of livestock;
   (c) inputing the unique identifying code for the group of livestock before mixing a first feed ration in the sequential series of feed rations;
   (d) calculating in the computer the total weight of the first feed ration previously mixed for the group of livestock;
   (e) repetitively comparing in the computer the total weight of the first feed ration to be fed with the total weight of the first feed ration previously mixed;
   (f) automatically mixing the first feed ration if the total weight to be fed is greater than the total weight previously mixed, and automatically mixing a next sequential feed ration if the total weight to be fed is equal to the total weight previously mixed; and
   (g) repeating steps (d) through (f) until the last feed rations in the feeding plan is mixed.

* * * * *